United States Patent [19]

Hunter

[11] 3,925,270

[45] Dec. 9, 1975

[54] POLYMERIC COMPOSITION COMPRISING SULFONYL CARBAZATES AS BLOWING AGENTS

[75] Inventor: Byron A. Hunter, Woodbridge, Conn.

[73] Assignee: Uniroyal, Inc., New York, N.Y.

[22] Filed: June 5, 1974

[21] Appl. No.: 476,752

[52] U.S. Cl............ 260/2.5 R; 106/122; 260/2.5 D; 260/2.5 N; 260/2.5 HA; 260/2.5 H; 260/2.5 HB; 260/2.5 P; 260/2.5 FP; 260/3; 260/13; 260/28.5 D; 260/42.47; 260/42.48; 260/42.52; 260/79.3 M; 260/470; 260/471 R; 260/480; 260/481 R; 260/724; 260/823; 260/857 R; 260/860; 260/874; 260/887; 260/898; 260/899; 260/900
[51] Int. Cl.[2]............................................ C08J 9/06

[58] Field of Search...... 260/2.5 R, 2.5 HA, 2.5 HB, 260/470, 471 R, 480, 481 R, 793 M

[56] References Cited
UNITED STATES PATENTS 3,235,519  2/1966  Hunter............................ 260/2.5 R

*Primary Examiner*—Morton Foelak
*Attorney, Agent, or Firm*—Bruce F. Jacobs, Esq.

[57] ABSTRACT

Sulfonyl carbazates containing at least one group of:
$$-SO_2-NHNH-COO-$$
wherein the oxygen and the sulfur atoms attach to various organic groups are useful as high temperature blowing agents for gas-expandable polymers. Additionally, novel polyfunctional and secondary-alkyl substituted sulfonyl carbazates have been discovered.

19 Claims, No Drawings

POLYMERIC COMPOSITION COMPRISING SULFONYL CARBAZATES AS BLOWING AGENTS

BACKGROUND OF THE INVENTION

1. Field of the Invention

This invention relates to both novel and known sulfonyl carbazates as well as their use in the art of manufacturing cellular polymeric materials. In particular, sulfonyl carbazates have been found especially useful as chemical blowing agents in the expansion of polymers. The chemicals of the invention are particularly valuable in the expansion of polymers such as elastomers and plastics which are normally processed at elevated temperatures and especially in plastics which are processed at temperatures above 225°C. Particular chemicals herein are even useful at expansion temperatures in excess of 250°C.

The sulfonyl carbazate compounds of this invention contain at least one chemical group of
—SO$_2$—NHNH—COO—
wherein the oxygen and the sulfur each attach to a various organic group, as hereafter described.

DESCRIPTION OF THE PRIOR ART

The use of certain monofunctional aryl sulfonyl carbazates of the structure

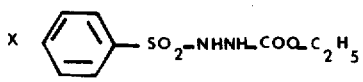

where X is H, CH$_3$, OCH$_3$, CH$_3$—CO—NH—, Cl, Br, or NO$_2$ in medicinal preparations, as wetting and lubricating agents, in the textile industry, in the dye industry, as herbicides, and as sedatives has been known from such articles as Zhurnal Organicheskoi Khimii, Vol. 7, No. 4, pp. 794–798, April 1971, J. Chemical Society (c) 1970 (org.) 2629, and Current Science No. 11, 1966, p. 283–4. However, none of these references has any suggestion of the usefulness of these compounds as blowing agents, nor is there any suggestion or disclosure of polyfunctional or secondary-alkyl substituted sulfonyl carbazates, the new compounds of this invention.

Blowing agents which decompose at relatively high temperatures are not new. U.S. Pat. No. 3,235,519 discloses using sulfonyl semicarbazides as blowing agents for polymeric materials which soften above 170°C. These blowing agents are particularly suitable for expanding high density polyethylenes, and many other rubbery and plastic polymers, but they are unsuitable for expanding certain polymers because they produce ammonia gas upon decomposition, which tends to attack some polymeric materials such as polycarbonates and polyesters, and, in some instances, to react with the metals used for the construction of molding equipment.

SUMMARY OF THE INVENTION

This invention provides a new class of blowing agents which decompose non-explosively, and controllably at temperatures such as to be valuable in the expansion of polymers such as elastomers and plastics which are normally processed at elevated temperatures and especially in plastics which are processed at temperatures above 225°C. Particular chemicals of the invention are useful at expansion temperatures in excess of 250°C.

The invention also provides novel polyfunctional and secondary-alkyl subatituted sulfonyl carbazates. The secondary-alkyl substituted sulfonyl carbazates either mono- or polyfunctional are particularly preferred because of their unexpected high gas evolution efficiency when compared with similar primary alkyl-substituted compounds.

DESCRIPTION OF THE PREFERRED EMBODIMENTS

The sulfonyl carbazate compounds of this invention contain at least one —SO$_2$—NHNH—COO— group per molecule, wherein the oxygen and sulfur are each bonded to various organic groups, as shown below.

There are four basic structures which the sulfonyl carbazates of this invention may possess.

First, the oxygen may be attached to a monofunctional group and the sulfur to another monofunctional group so as to give a structure of $$R—SO_2—NHNH—COO—R^1 \qquad \text{I}$$

wherein R and R$^1$ are the same or different and may be alkyl or alkenyl radicals having 1 to 12 carbon atoms; aryl, aralkyl, and alkaryl radicals containing 6 to 10 carbon atoms; and cycloalkyl radicals containing 5 to 8 carbon atoms, especially cyclohexyl. These radicals may be substituted by halogen or hydroxy groups.

Secondly the oxygen may be attached to a monovalent group as in Formula I while the sulfur is attached to a divalent group resulting in compounds of the structural formula $$R^1—OOC—NHNH—SO_2—Y—SO_2—NHNH—COO—R^1 \qquad \text{II}$$

wherein both R$^1$ radicals may be the same or different, preferably the same, and have the same meanings as indicated above. Y is a divalent radical such as alkylene having 2 to 12 carbon atoms, arylene or alkarylene having 6 to 12 carbon atoms, or a group of the structure $$—R^2—Z—R^3—$$

wherein Z is a single bond connecting R$^2$ and R$^3$ or is —O—, —S—, —SO—, —SO$_2$—, —NR$^4$— wherein R$^4$ is hydrogen or an alkyl group having from 1 to 4 carbon atoms, or Z is an alkylene radical having from 1 to 6 carbon atoms such as methylene, ethylene, propylene, tetramethylene and hexamethylene, or an alkylidene radical having 2 to 3 carbon atoms such as ethylidene and isopropylidene and R$^2$ and R$^3$ may be the same or different and are alkylene having 2 to 4 carbon atoms and phenylene.

Thirdly, the sulfur is attached to a monovalent group and the oxygen is attached to a divalent group leading to compounds of the structural formula $$R—SO_2—NHNH—COO—Y^1—OOC—NHNH—SO_2—R \qquad \text{III}$$

wherein the two R groups may be the same or different, preferably the same, and have the same meanings as indicated above, and Y has the same meaning as Y above.

And fourthly, both the oxygen and the sulfur may be attached to divalent groups thereby producing a polymer of the structure

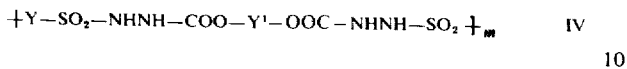

wherein Y and Y' as defined above and n is an integer from 2 to 100, preferably 2 to 50.

It can thus be seen that sulfonyl carbazate blowing agents may be described as hydrazine derivatives in which a hydrogen atom on one nitrogen atom is substituted by an organic sulfonyl radical and one hydrogen on the other nitrogen atom of the hydrazine moiety is substituted by a carbohydrocarboxy group. Thus, using this system of naming compounds, the following are illustrative both of names of compounds and of blowing agents useful for the purposes of the invention, especially those represented by Formula I above:

N-Benzene sulfonyl-N'-carbomethoxy hydrazine
N-Benzene sulfonyl-N'-carboethoxy hydrazine
N-Benzene sulfonyl-N'-carbo-n-propoxy hydrazine
N-Benzene sulfonyl-N'-carbiosopropoxy hydrazine
N-Benzene sulfonyl-N'-carbobutoxy hydrazine
N-Benzene sulfonyl-N'-carboisobutoxy hydrazine
N-Benzene sulfonyl-N'-carbo-sec-butoxy hydrazine
N-Benzene sulfonyl-N'-carbo-tert-butoxy hydrazine
N-Benzene sulfonyl-N'-carbo-2-methyl-2-butoxy hydrazine
N-Benzene sulfonyl-N'-carbo-3-methyl-2-butoxy hydrazine
N-Benzene sulfonyl-N'-carbo-3,3-dimethyl-2-butoxy hydrazine
N-Benzene sulfonyl-N'-carbo-3-methyl-2-pentoxy hydrazine
N-Benzene sulfonyl-N'-carbo-4-methyl-2-pentoxy hydrazine
N-Benzene sulfonyl-N'-carbo-2-octoxy hydrazine
N-Benzene sulfonyl-N'-carbo-3-octoxy hydrazine
N-Benzene sulfonyl-N'-carbo-3-ethyl-2-hexoxy hydrazine
N-Benzene sulfonyl-N'-carbododecyloxy hydrazine
N-Benzene sulfonyl-N'-carboallyloxy hydrazine
N-p-Toluene sufonyl-N'-carbomethoxy hydrazine
N-p-Toluene sulfonyl-N'-carboethoxy hydrazine
N-p-Toluene sulfonyl-N'-carbo-n-propoxy hydrazine
N-p-Toluene sulfonyl-N'-carboisopropoxy hydrazine
N-p-Toluene sulfonyl-N'-carbobutoxy hydrazine
N-p-Toluene sulfonyl-N'-carbo-sec-butoxy hydrazine
N-p-Toluene sulfonyl-N'-carbo-tert-butoxy hydrazine
N-p-Toluene sulfonyl-N'-carbo-2-methyl-2-butoxy hydrazine
N-p-Toluene sulfonyl-N'-carbo-3,3-dimethyl-2-hexoxy hydrazine
N-Methane sulfonyl-N'-carbomethoxy hydrazine
N-Methane sulfonyl-N'-carboethoxy hydrazine
N-Mehtane sulfonyl-N'-carboisopropoxy hydrazine
N-Methane sulfonyl-N'-carbo-tert-butoxy hydrazine
N-Ethane sulfonyl-N'-carboethoxy hydrazine
N-Ethane sulfonyl-N'-carboisopropoxy hydrazine
N-Propane sulfonyl-N'-carboisopropoxy hydrazine
N-Butane sulfonyl-N'-carboisopropoxy hydrazine The compounds and blowing agents which correspond to Formula II are exemplified by the following, which may be termed sulfonyl hydrazides:

1,3-Benzenebis(3-carbomethoxy sulfonyl hydrazide)
1,3-Benzenebis(3-carboethoxy sulfonyl hydrazide)
1,3-Benzenebis(3-carbo-n-propoxy sulfonyl hydrazide)
1,3-Benzenebis(3-carboisopropoxy hydrazide)
1,3-Benzenebis(3-carbobutoxy sulfonyl hydrazide)
1,3-Benzenebis(3-carbo-sec-butoxy sulfonyl hydrazide)
1,3-Benzenebis(3-carbo-tert-butoxy sulfonyl hydrazide)
Toluene-2,4-bis(3-carbomethoxy sulfonyl hydrazide)
Toluene-2,4-bis(3-carboisopropoxy sulfonyl hydrazide)
Toluene-2,4-bis(3-carbo-tert-butoxy sulfonyl hydrazide)
meta-Xylene-4,6-bis(3-carbomethoxy sulfonyl hydrazide)
meta-Xylene-4,6-bis(3-carboethoxy sulfonyl hydrazide)
meta-Xylene-4,6-bis(3-carboisopropoxy sulfonyl hydrazide)
meta-Xylene-4,6-bis(3-carbo-tert-butoxy sulfonyl hydrazide)
4,4'-Biphenylenebis(3-carbomethoxy sulfonyl hydrazide)
4,4'-Biphenylenebis(3-carboethoxy sulfonyl hydrazide)
4,4'-Biphenylenebis(3-carboisoporpoxy sulfonyl hydrazide)
4,4'-Biphenylenebis(3-carbo-sec-butoxy sulfonyl hydrazide)
4,4'-Biphenylenebis(3-carbo-tert-butoxy sulfonyl hydrazide)
Napthalene-1,5-bis(3-carboisopropoxy sulfonyl hydrazide)
Naphthalene-1,5-bis(3-carboallyloxy sulfonyl hydrazide)
Naphthalene-1,5-bis(3-carbooctoxy sulfonyl hydrazide)
Ethane-1,2-bis(3-carboethoxy sulfonyl hydrazide)
Ethane-1,2-bis(3-carbo-sec-butoxy sulfonyl hydrazide)
Ethane-1,2-bis(3-carbo-tert-butoxy sulfonyl hydrazide)
Propane-1,2-bis(3-carboisopropoxy sulfonyl hydrazide)
Butane-1,4-bis(3-carbo-tert-butoxy sulfonyl hydrazide)
Butane-1,4-bis(3-carbo-4,4-dimethyl-2-hexoxy sulfonyl hydrazide)
Butane-1,4-bis(3-carbo-4-ethyl-2-hexoxy sulfonyl hydrazide)
Butane-1,4-bis(3-carbododecyloxy sulfonyl hydrazide)
p,p'-Diphenyl etherbis(3-carbomethoxy sulfonyl hydrazide)
p,p'-Diphenyl etherbis(3-carboethoxy sulfonyl hydrazide)
p,p'-Diphenyl etherbis(3-carboisopropoxy sulfonyl hydrazide)
p,p'-Diphenyl etherbis(3-carbo-n-propoxy sulfonyl hydrazide)
p,p'-Diphenyl etherbis(3-carbo-sec-butoxy sulfonyl hydrazide)

The compounds and blowing agents which correspond to Formula III are exemplified by the following, which may be termed sulfonyl carbazates:

1,2-Ethylenebis(3-benzene sulfonyl carbazate)
1,2-Ethylenebis(3-p-toluene sulfonyl carbazate)
1,5-Oxydiethylenebis(3-p-toluene sulfonyl carbazate)
1,5-Oxydiethylenebis(3-benzene sulfonyl carbazate)
1,2-Ethylenebis(3-methane sulfonyl carbazate)
1,5-Oxydiethylenebis(3-propane sulfonyl carbazate)
4,4'-Biphenylenebis(3-methane sulfonyl carbazate)
p,p'-Oxydiphenylenebis(3-benzene sulfonyl carbazate)
p-Phenylenebis(3-butane sulfonyl carbazate)

The sulfonyl carbazate compounds of this invention can be prepared by either of two general procedures. One method (I) is to react a sulfonyl hydrazide with a chloroformic ester essentially in a 1 to 1 molar ratio and generally in a solvent or suspending medium and in the presence of a base to remove the acid formed. The reaction is:

The other method (II) is to react an organic sulfonyl chloride with an ester of carbazic acid, again generally in a solvent or suspending medium and in the presence of a base, according to the reaction:

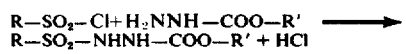

The R and R' being any of the groups defined above, and as illustrated in the examples below. The solvents or suspending medium for either method may be such as water, methanol ethanol, tetrahydrofuran, dimethylformamide, acetonitrile, isopropanol, ethylene dichloride and trichloroethyene.

The polymeric materials which may be expanded by these blowing agents include homopolymers, interpolymers, graft polymers, and mixtures and blends of two or more of these, and include thermoplastic, thermosetting, and rubbery polymers. In particular, the new blowing agents are useful for expading polymers that have high processing temperatures such as the polycarbonates, phenylene oxide-based resins, polyaryl sulfones, the various nylons, polyesters, certain polystyrenes, polypropylene, poly(styrene-acrylonitrile), polyacetals, poly(vinyl chloride), poly(vinyl acetate), polyphenylene sulfide, poly(methylpentene), low and high density polyethylenes, polyimides, polyaryl ethers, ABS polymers, polyacrylics, cellulosic polymers, halogenated polymers, especially the fluoroplastics, poly(ethylene-vinyl acetate), and polymer alloys. Other polymers include poly(butadiene-styrene), polyisoprene (including natural rubber), cis- or trans-polybutadiene, butyl rubber, ethylene-propylene copolymers, ethylene-propylene-non-conjugated diene terpolymers, and poly(butadiene-acrylontrile).

Generally, the amount of blowing agent used will depend on the nature of the polymer to be expanded, and the desired density of the foam to be produced. Usually, 0.05 to 15, and most often, 0.2 to 5.0 parts of blowing agent are employed, based on 100 parts of polymer by weight. The blowing agents can be used alone, or in combination with other blowing agents. Activating substances can be used to increase the efficiency of gas evolution, or to lower the normal decomposition temperature, of the blowing agents of the invention. Other additives such as plasticizers, fillers, nucleating agents, and the like can also be added to the polymer to be expanded.

Particularly effective blowing agents are those sulfonyl carbazates containing a secondary alkyl substituent on the oxygen atom of the carboxy group. The secondary alkyl substituted compounds show greatly increased gas evolution as compared to the primary alkyl containing related compounds. In particular, the isopropoxy derivatives generally yielded 35 to 80% more gas than the n-propoxy comparable derivative.

The following examples illustrate the preparation of some of the sulfonyl carbazates of the invention, their efficiency as gas-producing agents upon decomposition, and their use as blowing agents for producing expanded polymeric materials.

EXAMPLE I - N-METHANESULFONYL-N'-CARBOISOPROPOXY HYDRAZINE

In a 1-liter 3-neck flask is placed 17 g (0.5 mole) anhydrous hydrazine, 27 g. (1/4 mole) $Na_2CO_3$ and 100 cc. acetonitrile. The mixture is stirred as 57.3 g. (1/2 mole) of methanesulfonyl chloride is added slowly. The temperature of the mixture increases and $CO_2$ is evolved. Then another 27g. of $Na_2CO_3$ is added to the mixture and the mixture is stirred as 61.5 g. (0.5 mole) of isopropyl chloroformate is added, keeping the temperature under 40°C. Finally the mixture is stirred 2 hours and then cooled to 10°C. and filtered, washed with cold water and dried. This product melts at 129°–131°C.

| Analysis: | %N calc. 14.2; | found 13.84. |
|---|---|---|
| | %S calc. 16.3; | found 16.08. |
| | %C calc. 30.6; | found 30.81. |
| | %H calc. 6.14; | found 6.54. |

EXAMPLE II - N-BENZENESULFONYL-N'-CARBOMETHOXY HYDRAZINE 180 g. (0.2 mole) of methyl carbazate (from hydrazine and dimethyl carbonate) is placed in a liter flask. 20.0 g. (0.24 mole) of sodium bicarbonate and 100 ml. water are added. The mixture is stirred and dropped in 35.2 g. (0.2 mole) of benzene sulfonyl chloride. Then the mixture is stirred for 16 hours. The crystals that have formed are filtered off, washed with water, and dried in air. Yield = 34.5 g.; m.p. 149°–154°C. Upon recrystallization from ethanol 26 g. of material is recovered which melts sharply at 155°C.

| Analysis: | %N calc. 12.2%; found 12.16%. |
|---|---|
| | %S calc. 13.9%; found 14.19%. |

EXAMPLE III - N-BENZENESULFONYL-N'-(BETA-HYDROXY CARBOETHOXY) HYDRAZINE

To 60 g. of hydroxyethyl carbazate are added 100 ml. water and 42 g. $NaHCO_3$. The mix is stirred and 88.25 g. benzenesulfonyl chloride (0.5 mole ) is dropped in with the temperature slowly rising to 35°C. Stirring is continued for two hours. Crystals are filtered off, washed with water and dried. Yield = 90 g. m.p. 139°–142 °C. The material is then crystallized from ethanol, recovering 63 g., m.p. 145°–146°C.

Analysis: %N calc. 10.76%; found 10.95%.
%S calc. 12.3%; found 12.56%.

EXAMPLE IV - N-BENZENESULFONYL-N'-(CARBOISOPROPOXY) HYDRAZINE

A mixture of 172 g. (1.0 mole) of benzenesulfonyl hydrazide, 100 g. NaHCO$_3$, 200 ml. ethanol and 25 ml. water is stirred as 128.6 g. (1.05 mole) of isopropyl chloroformate is added dropwise over 15 minutes. The temperature rises from 25° to 44°C. as CO$_2$ is evolved during the addition. The mix is stirred for two hours more and the temperature rises as high as 53°C. (10 minutes) and then drops. Then 1000 ml. of water is added over a ten minute period. The mixture is stirred an additional hour and is then cooled to 15°c. The white crystalline product is filtered off and washed first with water and then with hexane. The dried product weighs 234.5 g. This crude product melts at 83°–127°C. and decomposes when heated over 220°C.

The material is dissolved in ammonium hydroxide, the aqueous solution being extracted with ether. The aqueous layer is then acidified and the white crystalline product filtered off and washed with water and dried. 112 g. of product are recovered which melt at 88°–247°C.

Analysis: %N calc. 10.85; found 10.75.
%S calc. 12.40; found 12.49.

EXAMPLE V - N-BENZENESULFONYL-N'-CARBOALLYLOXY HYDRAZINE

The following are placed in a 1-liter reaction flask:
34.4 g. Benzenesulfonyl hydrazide (0.2 mole) 20.0 g. NaHCO$_3$
100 ml. water The mixture is stirred and 24.1 g. (0.2 mole) of allyl chloroformate is added.

The mixture is stirred several hours as the temperature rises from 20 g. to 40°C.

The product is filtered off and washed with water. The material is taken up in a mixture of ethanol-hexane (1:1). Upon colling crystals are formed. This is filtered off and dried. Yield = 20 g. m.p. 92°–93°C.

Analysis: %N calc. 11.3%; found 11.46%.
%S calc. 12.5%; found 12.41%.

EXAMPLE VI - N-BENZENESULFONYL-N'-CARBOPHENOXY HYDRAZINE

In a liter reaction flask is placed the following:

34.4 g. (0.2 mole) Benzenesulfonyl hydrazide
200 ml. water
20 g. NaHCO$_3$
31.3 g. (0.2 mole ) of phenyl chloroformate are added with stirring. The mixture is the stirred for four hours and the crystalline product filtered off, washed and dried. Yield = 52.0 g. This melts at 135°–45 C°. After recrystallization from ethanol the material melts at 150°–151°C.

Analysis: %N calc. 9.58; found 9.64%.
%S calc. 10.96; found 11.29%.

EXAMPLE VII - N-(P-TOLUENESULFONYL)-N'-(CARBOETHOXY)HYDRAZINE 186g. (1.0 mole) of p-toluenesulfonyl hydrazide, 100 g. NaHCO$_3$ and 500 ml. water are stirred together in a 2-liter flask as 117 g. (1.03 moles) of ethyl chloroformate is dropped in slowly. The temperature rises from 23° to 47°C. in twenty minutes. The mixture is stirred for two hours and the crystalline product is filtered, washed with water and dried. Yield = 228 g. This melts at 97°–105°C. A portion is recrystallized from ethanol. m.p. = 105°–106°C.

Analysis: %N calc. = 10.80%; found 11.07%.
%S calc. = 12.4%; found 12.68%.

EXAMPLE VIII - N-P-TOLUENESULFONYL-N'-ISOPROPOXY HYDRAZINE

A mixture of 186 g. (1.0 mole) p-toluene sulfonyl hydrazide, 100 g. NaHCO$_3$, 200 ml. ethanol and 25 ml. of water is stirred as 128.5 g. (1.05 mole) isopropyl chloroformate is dropped in. The temperature gradually rises to 43°C. On continued stirring the mixture gradually changes to a crystalline mush. 1600 ml. of water is added and the mixture is stirred ten minutes. The product is filtered off and washed well with water and dried. Yield = 231 g. This product is taken up in concentrated ammonium hydroxide and filtered from some insolubles. Treatment with water and dilute hydrochloric acid precipitates a product, which, after washing with water and drying (60°C) weighs 154 g. and melts at 11.5°–112°C. A portion is recrystallized from ethanol and melts at 112°–113°C.

Analysis: %N calc. 10.30; found 10.37.
%S calc. 11.75; found 13.54.

EXAMPLE IX

The basic procedures of the above Examples are repeated for various compounds of the structure of Formula I: R—SO$_2$—NNNH—COO—R$^1$ wherein R and R$^1$ are as defined in Table IA below. As can be seen from the gas evolution date in Table IB the compounds containing secondary-alkyl substituents for R$^1$ have considerably higher gas evolution yields than the primary alkyl containing compounds.

The gas evolution is measured by heating the compound beyond its decomposition point in contact with a heat transfer medium, such as a silicone oil, and the volume of gas evolved is determined by difference in a mercury filled gas burette. The final volume of the expanded gas is taken at room temperature and then corrected to standard temperature and pressure.

TABLE I

A

| Run No. | Method | R¹ | | %C | %H | Analysis %N | %S | %Cl |
|---|---|---|---|---|---|---|---|---|
| 1 | II | CH₃ | CH₃ | 21.23(21.42) | 4.79(4.76) | 16.43(16.67) | 18.84(19.05) | — |
| 2 | II | " | C₂H₅ | 26.20(26.37) | 5.70(5.50) | 15.20(15.38) | 18.09(17.58) | — |
| 3 | I | " | n-C₃H₇ | 30.18(30.61) | 6.10(6.12) | 13.90(14.29) | 16.33(16.33) | — |
| 4 | II | " | i-C₃H₇ | 30.81(30.61) | 6.38(6.12) | 13.94(14.29) | 16.08(16.33) | — |
| 5 | II | " | i-C₄H₉ | 34.35(34.29) | 6.73(6.67) | 13.11(13.33) | 15.76(15.24) | — |
| 6 | II | " | 2-C₄H₉ | 34.13 " | 6.64 " | 13.13 " | 15.34 " | — |
| 7 | II | C₂H₅ | CH₃ | 26.21(26.37) | 5.48(5.50) | 14.90(15.38) | 17.21(17.58) | — |
| 8 | II | " | C₂H₅ | 30.18(30.61) | 6.30(6.12) | 13.84(14.29) | 16.31(16.33) | — |
| 9 | II | " | n-C₃H₇ | 33.93(34.29) | 6.87(6.67) | 13.02(13.33) | 15.08(15.24) | — |
| 10 | II | " | i-C₃H₇ | 33.92 " | 6. " | 13.08 " | 15.22 " | — |
| 11 | II | " | 2-C₄H₉ | 37.01(37.50) | 7.27(7.14) | 12.35(12.50) | 14.25(14.29) | — |
| 12 | II | n-C₄H₉ | CH₃ | 33.78(34.29) | 6.67(6.67) | 13.04(13.33) | 15.81(15.24) | — |
| 13 | II | " | i-C₃H₇ | 40.02(40.34) | 7.68(7.56) | 11.52(11.76) | 13.35(13.45) | — |
| 14 | II | " | n-C₃H₇ | 39.73 " | 7.69 " | 11.55 " | 13.28 " | — |
| 15 | II | ⌬- | CH₃ | (41.73) | (4.35) | 12.11(12.17) | 14.19(13.91) | — |
| 16 | II | " | C₂H₅ | (44.26) | (4.92) | (11.48) | (13.11) | — |
| 17 | II | " | n-C₃H₇ | 46.37(46.51) | 5.33(5.42) | 10.70(10.85) | 12.20(12.40) | — |
| 18 | II | " | i-C₃H₇ | " | " | " | " | — |
| 19 | I | " | n-C₄H₉ | 48.56(48.53) | 6.12(5.89) | 10.21(10.29) | 11.52(11.76) | — |
| 20 | II | " | i-C₄H₉ | 48.32 " | 5.84 " | 10.17 " | 11.55 " | — |
| 21 | II | " | 2-C₄H₉ | 48.64 " | 5.93 " | 10.13 " | 11.57 " | — |
| 22 | I | " | n-C₁₂H₂₅ | 58.77(59.37) | 8.50(8.33) | 7.00(7.29) | 8.14(8.33) | — |
| 23 | I | CH₃-⌬- | CH₃ | 43.92(44.26) | 5.00(4.92) | 11.10(11.48) | 12.97(13.11) | — |
| 24 | I | " | C₂H₅ | (46.51) | (5.42) | 11.07(10.35) | 12.68(12.40) | — |
| 25 | II | " | n-C₃H₇ | 48.21(48.53) | 5.91(5.89) | 10.30(10.29) | 11.77(11.76) | — |
| 26 | II | CH₃-⌬- | i-C₃H₇ | (48.53) | (5.89) | 10.37(10.29) | 11.98(11.76) | — |
| 27 | II | " | i-C₄H₉ | 50.47(50.35) | 6.54(6.29) | 9.63(9.79) | (11.19) | — |
| 28 | II | " | 2-C₄H₉ | 50.22 " | 6.29 " | 9.67 " | 11.39 " | — |
| 29 | II | Cl-⌬- | CH₃ | 36.13(36.30) | 3.16(3.40) | 10.1(10.6) | 12.1(12.1) | 13.61(13.4) |
| 30 | II | " | C₂H₅ | 39.12(38.7) | 4.06(3.96) | 9.67(10.8) | 11.54(11.5) | 13.24(12.7) |
| 31 | II | " | n-C₃H₇ | 40.9(41.0) | 4.43(4.45) | 8.97(9.55) | 10.84(10.9) | 12.68(12.1) |
| 32 | II | " | i-C₃H₇ | 40.71 " | 4.48 " | 9.20 " | 10.86 " | 13.38 " |
| 33 | II | " | 2-C₄H₉ | 43.25(43.1) | 4.92(4.91) | 8.83(9.18) | 10.36(10.42) | 12.04(11.6) |
| 34 | II | ⌬-CH₂- | n-C₃H₇ | 48.64(48.6) | 6.06(5.88) | 10.19(10.29) | 11.66(11.76) | — |
| 35 | II | " | i-C₃H₇ | 48.56 " | 5.90 " | 10.11 " | 11.78 " | — |

TABLE I

| Run No. | m.p.°C | B cc/g | Gas Evolution cc/mmole |
|---|---|---|---|
| 1 | 105–106 | 303 | 50.9 |
| 2 | 89.5–90.5 | 286 | 52.2 |
| 3 | 105.5–106.5 | 219 | 42.9 |
| 4 | 129–131 | 330 | 64.7 |
| 5 | 105.5–106 | 231 | 48.5 |
| 6* | 81–82 | 314 | 65.9 |
| 7 | 118–119 | 285 | 51.9 |
| 8 | 91.5–92.5 | 255 | 50.0 |
| 9 | 100–101 | 213 | 44.7 |
| 10 | 137–139 | 305 | 63.6 |
| 11 | 88–90 | 275 | 61.6 |
| 12 | 67 | 252 | 52.8 |
| 13 | 83–84 | 246 | 58.5 |
| 14 | 60–61 | 198 | 47.1 |
| 15 | 149–150 | 182 | 41.9 |
| 16 | 112–113 | 160 | 24.4 |
| 17 | 81–82 | 168 | 43.7 |
| 18 | 83–84 | 228 | 58.9 |
| 19 | 91–92 | — | — |
| 20 | 122–123 | 141 | 38.4 |
| 21 | 72–73 | 230 | 62.6 |
| 22 | 79–80 | — | — |
| 23 | 149–150 | 194 | 47.3 |
| 24 | 105–105.5 | 171 | 44.1 |
| 25 | 75–76 | 149 | 40.5 |
| 26 | 105–106 | 233 | 63.4 |
| 27 | 87–87.5 | 133 | 38.0 |
| 28 | 89–90 | 203 | 58.0 |
| 29 | 137–139 | 159 | 42.0 |
| 30 | 137–138 | 145 | 40.4 |
| 31 | 107–108 | 144 | 42.1 |
| 32 | 141–142 | 266 | 77.8 |
| 33 | 107–108 | 186 | 57.1 |
| 34 | 101–102 | 121 | 32.9 |
| 35 | 134–135 | 185 | 50.3 |

EXAMPLE X --
BUTANE-1,4-BIS(3-CARBO-N-PROPOXY SULFONYL HYDRAZIDE

Into a 1 liter 3-neck flask is placed 25.5 g. (0.1 mole) butane-1,4-disulfonyl chloride, 200 ml. methanol and 20.0 g. (0.24 mole) of NaHCO₃. With stirring 26.0 g. (0.22 mole) of n-propyl carbazate is added. It is heated to reflux with stirring for two hours, cooled and diluted with 300 ml. water, stirred until a solid separates. The solid is filtered and taken up in concentrated ammonium hydroxide solution. It is filtered and the filtrate is acidified with dilute sulfuric acid. The separated solid is filtered off and washed with water. The dried product weighs 20.5 g. m.p. = 163°–5°C.

This product produces a large volume of gas when heated above 260°C. (161 cc/g STP)

| Analysis: | calc. | found |
|---|---|---|
| %C | 34.5 | 34.19 |
| %H | 6.21 | 6.33 |
| %N | 13.4 | 13.22 |
| %S | 15.3 | 14.81 |

EXAMPLE XI -
1,3-DIMETHYLBENZENE-4,6-BIS(3-CARBOMETHOXY SULFONYL HYDRAZIDE

A 1-liter reaction flask is charged with 60.6 g. (0.2 mole) 1,3-dimethylbenzene-4,6-disulfonyl chloride, 32 g. (0.4 mole) pyridine and 300 ml. ethylene dichloride. The mixture is stirred as 36 g. (0.4 mole ) of methyl carbazate in 100 ml. ethylene dichloride at a temperature of about 50°C. is added over 30 minutes. The temperature rises to 55°C. The mixture is then stirred and heated to gentle reflux for 1/2 hour. 150 ml. of water is added and the mixture is cooled to 20°C. The white precipitate is filtered off and washed well with water. The dried product weighs 50 g. and melts with decomposition at 237° C. The product is then dissolved in ammonium hydroxide solution, filtered and the filtrate acidified with dilute sulfuric acid. There is recovered 44 g. (dry) of product which melts with decomposition at 240°C.

| Analysis: | %N calc. 13.66; found 13.40. |
|---|---|
| | %S calc. 15.61; found 15.38. |

EXAMPLE XII -
1,3-DIMETHYLBENZENE-4,6-BIS(3-CARBOETHOXY SULFONYL HYDRAZIDE

A 2-liter reaction flask is charged with 60.6 g. (0.2 mole) of 1,3-dimethylbenzene-4,6-bisulfonyl chloride, 32 g. (0.4 mole) of pyridine and 500 ml. of ethylene dichloride. The mixture is stirred as 41.6 g. (0.4 mole) of ethyl carbazate is added dripwise over 1/2 hour. The temperature rises from 25°C. to 50°C. The mixture is heated to gentle reflux for 1/2 hour and then cooled to 20°C. The ethylene dichloride layer is removed and the oily lower layer, when placed in water, becomes crystalline. The white product is filtered off and then dissolved in ammonium hydroxide solution. The filtered solution is acidified with dilute sulfuric acid and the resulting precipitate filtered off, washed well with water and dried. Yield = 57 g.; m.p. 188°–190°C. (dec. 200°–260°C.).

| Analysis: | %N calc. 12.78; found 12.38. |
|---|---|
| | %S calc. 14.61; found 14.53. |

EXAMPLE XIII - 1,3-DIMETHYLBENZENE-4,6-BIS(3-CARBO-N-PROPOXY SULFONYL HYDRAZIDE

This experiment is conducted in a manner similar to that of example XI. That is, a mixture of 60.6 g. (0.2 mole) of 1,3-dimethylbenzene-4,6-disulfonyl chloride, 32 g. (0.4 mole) puridine and 500 ml. of ethylene chloride is treated with 47.2 g. (0.4 mole) of n-propyl carbazate. The product crystallizes slowly. Yield = 49 g.

m.p. = 148°–152°C. Decomposition Range = 190°–265°C.

| Analysis: | %N calc. 12.07; found 11.67. |
|---|---|
| | %S calc. 13.73; found 13.52. |

EXAMPLE XIV -
NAPHTHALENE-1,5-BIS(3-CARBOETHOXY SULFONYL HYDRAZIDE)

Into a 1-liter 3 neck flask is placed 32.5 g. (0.1 mole) napthalene-1,5-disulfonyl chloride, 180 g. (0.2 mole) sodium, bicarbonate and 200 ml. methanol. Then 20.8 g. of ethyl carbazate is added and the mixture is stirred and heated to gentle reflux for 2 hours. The cooled product is filtered, washed with water, and dried. Yield = 37.5 g. This material is then dissolved in 300 ml. of concentrated ammonium hydroxide, filtered (through celite) and the filtrate is acidified with dilute sulfuric acid. The resulting solid is filtered, washed with water and dried. Yield = 35.0 g. m.p. =265°C. (dec.)

| Analysis: | calc. | found |
|---|---|---|
| %C | 41.9 | 41.64 |
| %H | 4.35 | 4.18 |
| %N | 12.1 | 11.69 |
| %S | 13.9 | 13.48 |

EXAMPLE XV -
4,4'-BIPHENYLENEBIS(3-CARBOMETHOXY SULFONYL HYDRAZIDE)

In a 5-liter flask is placed 342 g. (1.0 mole) of biphenyl-4,4'-disulfonyl hydrazide, 200 g. sodium bicarbonate (2.4 mole), 1 liter of acetonitrile and 100 ml. water. The mix is stirred as 208 g. (2.2 mole) of methyl chloroformate is added slowly. The mix is then stirred for 3 hours at 40°C. and the temperature is gradually increased to reflux temperature (1 hour). The mix is cooled and the product is filtered, washed with water and dried. Yield = 520 g.

Purification of a portion is performed by dissolving it in concentrated ammonium hydroxide, filtering, and acidifying the filtrate. The white solid is filtered off, washed with water and dried. This melts with decomposition at 249°–251°C.

| Analysis: | Calc. | found |
|---|---|---|
| %C | 42.0 | 42.50 |
| %H | 3.95 | 4.36 |
| %N | 12.2 | 11.63 |
| %S | 13.95 | 13.92 |

This product was also prepeared by reacting biphenyl-4,4'-disulfonyl chloride with methyl carbazate in acetonitrile in the presence of sodium bicarbonate with similar results.

EXAMPLE XVI -
4,4'-BIPHENYLENEBIS(2-CARBOETHOXY SULFONYL HYDRAZIDE)

70.2 g. (0.2 mole) of 4,4'-biphenyldisulfonyl chloride, 400 ml. acetonitrile and 40.0 g. (0.47 mole) sodium bicarbonate are placed in a liter flask. The mix is stirred as 45.8 (0.44 mole) of ethyl carbonate is added. An increase in temperature is observed. The mix is stirred and heated to gentle reflux for two hours. The hot mix is then filtered and the solid product is slurried in water, filtered and washed well with water and dried. The material is then taken up in concentrated ammonium hydroxide solution, filtered (through celite) and the filtrate acidified with dilute sulfuric acid. The separated solid is filtered, washed and dried. Yield = 79.5 g. Melting point = 225°-226°C. (decomposed).

| Analysis: | calc. | found |
|---|---|---|
| %C | 44.5 | 44.89 |
| %H | 4.52 | 4.39 |
| %N | 11.50 | 11.32 |
| %S | 13.15 | 13.14 |

EXAMPLE XVII - 4,4'-BIPHENYLENEBIS(3-CARBO-N-PROPOXY SULFONYL HYDRAZIDE)

A 2-liter flask is charged with 70.2 g. (0.2 mole) of biphenyl-4,4'-disulfonyl chloride, 800 ml. ethylene dichloride and 32 g. (0.4 mole) pyridine. The temperature is adjusted to 55°C. (complete solution) and the solution is stirred as 47.2 g. (0.4 mole) of n-propyl carbazate is added dropwise over 1/2 hour, keeping the temperature between 55°-60°C. The mix is stirred an additional hour and is cooled to 20°C. The ethylene dichloride layer is pured off and the semicrystalline residue is mixed with water. The crystalline product is filtered off, washed with water and dried at 60°C. Yield = 100 g. (97% of theory). m.p. = 152°-158°C, dec. 195°-260°C.

| Analysis: | calc. | found |
|---|---|---|
| %N | 10.89 | 10.49 |
| %S | 12.45 | 12.47 |
| %C | 46.69 | 46.79 |
| %H | 5.06 | 5.08 |

EXAMPLE XVIII - 4,4'-BIPHENYLENEBIS(3-CARBO-2-ETHYLHEXOXY SULFONYL HYDRAZIDE)

A 3-liter flask is charged with 171 g. (0.5 mole) of biphenyl-4,4'-disulfonyl hydrazide, 92.4 g. (1.1 mole) of sodium bicarbonate and 500 ml. acetonitrile. The mix is stirred as 202.1 g. (1.05 mole) of 2-ethylhexyl chloroformate is poured in. The mix is heated gradually to 60°C. and $CO_2$ is evolved. After ½ hour the mix becomes quite thick and 500 ml. of acetonitrite is added. The mixture is refluxed for two hours and is then cooled and filtered. About 37 g. of insoluble material is removed. Two liters of water is then added to the acetonitrite filtrate. A precipitate gradually forms. After ½ hour this is filtered off, washed well with water and dried. Yield = 184 g. A portion is recrystallized from ethanal. m. p. = 144°-146°C.

| Analysis: | calc. | found |
|---|---|---|
| %C | 56.7 | 55.87 |
| %H | 7.24 | 7.27 |
| %N | 8.35 | 8.50 |

| Analysis: | calc. | found |
|---|---|---|
| %S | 10.1 | 9.91 |

EXAMPLE XIX - DIPHENYL ETHERBIS (BENZENE-3-CARBOMETHOXY SULFONYL HYDRAZIDE)

To a 3-liter flask are added 17.9 g. (0.5 mole) diphenyl etherbis(benzene-sulfonyl hydrazide), 100 g. (1.13 mole) sodium bicarbonate and 500 mml. Methanol. With stirring 103 g. (1.1 mole) of methyl chloroformate is gradually added. After all has been added the mix is stirred for two hours. A liter of water is added, whereupon the product crystallizes. The white solid is filtered off, washed with water and dried. Yield = 166 g. A portion is dissolved in concentrated $NH_4OH$, filtered and precipitated with acid and the resulting solid is recrystallized from ethanol, and it melts at 124°-125°C.

| Analysis: | Calc. | found |
|---|---|---|
| %C | 40.4 | 40.47 |
| %H | 3.8 | 3.79 |
| %N | 11.8 | 11.18 |
| %S | 13.5 | 13.22 |

EXAMPLE XX - DIPHENYL ETHERBIS (3-CARBOETHOXY SULFONYL HYDRAZIDE)

A mixture of 30 g. (0.004 mole) of diphenyl etherbis-(benzenesulfonyl hydrazide), 50 ml. ethanol and 25 ml. water is stirred as 9.1 g. (0.042 mole) of ethyl chloroformate is dropped in over ½ hour. Practically all passes into solution. Then 14.1 g. (0.168 mole) of $NaHCO_3$ is added gradually, with $CO_2$ being evolved. Then a further 9.1 g. of ethyl chloroformate is added slowly. The mix becomes cloudy and after two hours' stirring a heavy precipitate forms. The mixture is diluted with 150 cc. of water and the solid filtered off and washed with water and dried. A portion is recrystallized from ethanol. This melts at 180°C. and decomposes when heated to 210°-240°C.

| Analysis: | calc. | found |
|---|---|---|
| %N | 11.11 | 11.33 |
| %S | 12.70 | 12.79 |

EXAMPLE XXI - DIPHENYL ETHERBIS (3-CARBOISOPROPOXY SULFONYL HYDRAZIDE)

A mixture of 179 g. (½ mole) diphenyl etherbis (benzene sulfonyl hydrazide), 100 g. $NaHCO_3$, 200 ml. water is stirred as 128.6 g. (1.05 mole) of isopropyl chloroformate is added over a period of 20 minutes as the temperature rises from 25° to 32°C. Stirring is continued for two hours as the temperature increases to 40°C. (after 1st half hour) and then drops off. 250 ml. of methanol is added to keep the mixture stirrable. Then 1000 ml. of water is added over ten minutes and the mixture is cooled to 10°C. (ice water) and the product is filtered and washed well with hot water and dried.
Yield = 196 g. m.p. 189°–191°C. (dec.).

| Analysis: | calc. | found |
|---|---|---|
| %N | 10.57 | 10.74 |
| %S | 12.08 | 12.22 |

EXAMPLE XXII

The basic procedures of Examples X-XXI are repeated for various compounds of the structure of Formula II wherein the Y and $R^1$ radicals are as defined in Table IIA below. Table IIB gives the melting points and gas evolution data for these compounds.

TABLE II

A

| Run No. | Method | Y | $R^1$ | %C | %H | Analysis %N | %S |
|---|---|---|---|---|---|---|---|
| 40 | II | 1,4-$C_4H_8$ | $CH_3$ | 26.4(26.52) | 5.06(4.97) | 15.01(15.46) | 17.64(17.68) |
| 41 | II | '' | $C_2H_5$ | 30.18(30.79) | 5.67(5.64) | 13.79(14.36) | 16.46(16.41) |
| 42 | I | '' | n-$C_3H_7$ | 34.19(34.45) | 6.33(6.72) | 13.22(13.40) | 14.81(15.31) |
| 43 | II | '' | i-$C_3H_7$ | 34.13 '' | 6.43 '' | 12.86 '' | 15.56 '' |
| 44 | II | '' | i-$C_4H_9$ | 37.02(37.67) | 6.63(6.73) | 11.77(12.56) | 14.58(14.35) |
| 45 | II | '' | 2-$C_4H_9$ | 37.51 '' | 7.06 '' | 12.00 '' | 14.42 '' |
| 46 | II | (phenyl) | $CH_3$ | | | | |
| 47 | II | '' | $C_2H_5$ | | | | |
| 48 | II | '' | n-$C_3H_7$ | | | | |
| 49 | II | '' | i-$C_3H_7$ | | | | |
| 50 | II | '' | 2-$C_4H_9$ | | | | |
| 51 | II | $CH_3$-(phenyl)- | $CH_3$ | | | | |
| 52 | II | '' | $C_2H_5$ | | | | |
| 53 | II | '' | n-$C_3H_7$ | | | | |
| 54 | II | '' | i-$C_3H_7$ | | | | |
| 55 | II | '' | 2-$C_4H_9$ | | | | |
| 56 | II | $CH_3$,$CH_3$-(phenyl)- | $CH_3$ | | | | |
| 57 | II | '' | $C_2H_5$ | | | | |
| 58 | II | '' | n-$C_3H_7$ | | | | |
| 59 | I | '' | i-$C_3H_7$ | 40.91(41.20) | 5.60(5.58) | 11.56(12.01) | 13.62(13.73) |
| 60 | I | '' | 2-$C_4H_9$ | | | | |
| 61 | II | $CH_3$,$CH_3$-(phenyl)- | $CH_3$ | | | | |
| 62 | II | '' | $C_2H_5$ | | | | |
| 63 | II | '' | n-$C_3H_7$ | | | | |
| 64 | I | $CH_3$,$CH_3$-(phenyl)- | i-$C_3H_7$ | 40.94(41.20) | 5.59(5.58) | 11.64(12.01) | 13.64(13.73) |
| 65 | II | '' | 2-$C_4H_9$ | | | | |
| 66 | II | $CH_3$-(phenyl)-$CH_3$ | $CH_3$ | | | | |
| 67 | II | '' | $C_2H_5$ | | | | |
| 68 | II | '' | n-$C_3H_7$ | 41.29(41.20) | 5.76(5.58) | 11.61(12.01) | 13.38(13.73) |
| 69 | II | '' | i-$C_3H_7$ | 41.36 '' | 5.56 '' | 11.98 '' | 13.37 '' |
| 70 | II | '' | 2-$C_4H_9$ | | | | |
| 71 | II | (naphthyl) | $CH_3$ | | | | |
| 72 | II | '' | $C_2H_5$ | 41.64(41.74) | 4.18(4.35) | 11.70(12.17) | 13.48(13.91) |
| 73 | II | '' | n-$C_3H_7$ | 44.29(44.26) | 4.87(4.92) | 10.89(11.48) | 12.84(13.11) |
| 74 | II | '' | i-$C_3H_7$ | 44.06 '' | 5.00 '' | 11.14 '' | 13.10 '' |
| 75 | II | '' | i-$C_4H_9$ | 46.56(46.51) | 5.59(5.43) | 10.14(10.85) | 12.11(12.40) |
| 76 | II | '' | n-$C_3H_7$ | | | | |
| 77 | II | '' | i-$C_3H_7$ | | | | |
| 78 | I | (biphenyl) | $CH_3$ | 42.5(41.92) | 4.36(3.93) | 11.63(12.22) | 14.14(14.0) |
| 79 | I | '' | $C_2H_5$ | 44.89(44.44) | 4.39(4.53) | 11.32(11.52) | 13.14(13.17) |
| 80 | II | '' | n-$C_3H_7$ | 46.70(46.70) | 5.08(5.06) | 10.49(10.89) | 12.47(12.45) |
| 81 | I | '' | i-$C_3H_7$ | 46.99 '' | 5.06 '' | 10.22 '' | 12.22 '' |
| 82 | I | '' | n-$C_4H_9$ | 49.14(48.71) | 5.63(5.54) | 9.89(10.33) | 11.72(11.81) |
| 83 | II | '' | i-$C_4H_9$ | 47.27 '' | 5.96 '' | 9.44 '' | 11.13 '' |

TABLE II-continued

| Run No. | Method | Y | $R^1$ | A %C | %H | Analysis %N | %S |
|---|---|---|---|---|---|---|---|
| 84 | II | " | $2-C_4H_9$ | | | | |
| 85 | I | " | 2-ethylhexyl | 55.64(55.0) | 7.27(7.00) | 8.50(9.00) | 9.91(10.00) |
| 86 | II | –⌬–O–⌬– | $CH_3$ | 40.60(40.50) | 3.81(3.80) | 11.44(11.81) | 13.07(13.50) |
| 87 | I | " | $C_2H_5$ | 43.03(43.02) | 4.39(4.38) | 10.72(11.16) | 12.65(12.75) |
| 88 | II | " | $n-C_3H_7$ | 45.16(45.28) | 5.00(4.90) | 10.04(10.57) | 12.10(12.08) |
| 89 | I | " | $i-C_3H_7$ | 45.15 " | 4.87 " | 9.89 " | 12.01 " |
| 90 | II | " | $n-C_4H_9$ | (47.31) | (5.38) | (10.01) | (11.47) |
| 91 | II | " | $i-C_4H_9$ | 47.15 " | 5.59 " | 9.88 " | 11.41 " |
| 92 | II | " | $2-C_4H_9$ | 47.98 " | 5.57 " | 9.83 " | 11.34 " |

TABLE II

| Run No. | m.p.°C | B Gas Evolution cc/g | cc/mmole |
|---|---|---|---|
| 40 | 170–172 | 204 | 73.8 |
| 41 | 121–122 | 179 | 69.8 |
| 42 | 164–165 | 161 | 67.3 |
| 43 | 203–205 | 266 | 111.2 |
| 44 | 209–211 | 154 | 68.7 |
| 45 | 184–186 | 240 | 107.0 |
| 46 | 198–199 | 186 | 71.5 |
| 47 | 172–175 | 179 | 73.4 |
| 48 | 170–171 | 163 | 71.5 |
| 49 | 190–191 | 275 | 120.5 |
| 50 | 157–158 | 199 | 92.7 |
| 51 | 193–197 | 199 | 78.8 |
| 52 | — | — | — |
| 53 | — | 187 | 84.5 |
| 54 | 197–198 | 256 | 115.7 |
| 55 | 183–184 | 234 | 112.2 |
| 56 | 233 | 172 | 70.5 |
| 57 | 185–187 | 194 | 84.9 |
| 58 | 129–130 | 176 | 82.0 |
| 59 | 193–196 | 237 | 110.4 |
| 60 | 173–174 | 219 | 108.2 |
| 61 | 231.5–232 | 174 | 71.3 |
| 62 | 183–187 | 179 | 78.4 |
| 63 | 145–147 | 143 | 66.6 |
| 64 | 181–183 | 258 | 120.2 |
| 65 | 142–144 | 215 | 106.2 |
| 66 | 202–204 | 188 | 77.1 |
| 67 | 205–208 | 173 | 75.8 |
| 68 | 170–171 | 164 | 76.4 |
| 69 | 212 (decomp.) | 248 | 114.6 |
| 70 | 160–162 | 204 | 100.8 |
| 71 | 265 (decomp.) | 179 | 77.3 |
| 72 | 275 (decomp.) | 187 | 86.0 |
| 73 | 245 (decomp.) | 154 | 75.2 |
| 74 | 245 (decomp.) | 242 | 118.1 |
| 75 | 257 (decomp.) | 166 | 85.9 |
| 76 | 207–208 | 160 | 78.1 |
| 77 | 223–224 | 237 | 115.7 |
| 78 | 260 (decomp.) | 136 | 62.3 |
| 79 | 225 (decomp.) | 124 | 60.3 |
| 80 | 154.5 | 155 | 79.7 |
| 81 | 208–209 | 230 | 118.2 |
| 82 | 210–211 | 143 | 77.5 |
| 83 | 191–192 | 137 | 74.3 |
| 84 | 199–200 | 190 | 103.0 |
| 85 | 144–146 | — | — |
| 86 | 180–181 | 166 | 78.7 |
| 87 | 185–187 | 173 | 86.8 |
| 88 | 170–172 | 174 | 92.2 |
| 89 | 194–199 | 221 | 117.1 |
| 90 | 124–125 | 142 | 79.3 |
| 91 | 158–159 | 129 | 72.0 |
| 92 | 144–145 | 205 | 114.4 |

EXAMPLE XXIII

Into a 2 liter 3-necked flask is introduced 172g (1.0 mole) of benzene sulfonyl hydrazide, 92.4g (1.1 mold) of sodium bicarbonate and one liter of acetonitrile. The mixture is stirred as 93.5g (0.5 mole) of ethylene bis (chloroformate) is added gradually over one hour. Carbon dioxide is evolved and an exothermic reaction occurs (temperature rose to 55°C. The mixture is heated to gentle reflux for three hours and then allowed to cool. The white product is then filtered off and washed well with water. The dried product weighs 192.5g. This is taken up in concentrated ammonium hydroxide and the solution filtered from insolubles, using Celite filter aid. The filtrate is acidified with dilute sulfuric acid and the warm suspension is filtered, washed well with water, and dried. Yield = 164g. mp. 205°C (dec).

| Analysis: | Calc. | Found |
|---|---|---|
| %C | 41.92 | 41.40 |
| H | 3.94 | 3.95 |
| N | 12.23 | 11.89 |
| S | 13.97 | 13.94 |

EXAMPLE XXIV

PREPARATION OF ETHYLENE BIS (3-P-TOLUENE SULFONYL CARBAZATE)

In a manner similar to that described in Example XXIII 186g (1.0 Mole) of p-toluene sulfonyl hydrazide, 92.4g sodium bicarbonate and 500 ml. of water are stirred together as 93.5g (0.5. mole) of ethylene bis chloroformate is added dropwise. The mixture warms up to 40°C as carbon dioxide is evolved. The mixture is heated to reflux temperature until no more $CO_2$ is evolved. The product is cooled and filtered and washed well with water. Yield 195g mp 235°C (dec.)

| Analysis | Calc. | Found |
|---|---|---|
| % C | 44.44 | 44.34 |
| H | 4.52 | 4.51 |
| N | 11.52 | 11.38 |
| S | 13.17 | 13.01 |

EXAMPLE XXV

POLYMERIC REACTION PRODUCT OF 4,4' BIPHENYLENE BIS (SULFONYL HYDRAZIDE) AND ETHYLENE BIS (CHLOROFORMATE)

In a 2 liter 3 neck flast are placed 171g (0.5 mole) of 4,4' biphenylene bis (sulfonyl hydrazide) 92.5g (1.1 mole) $NaHCO_3$ and 1000 ml. acetonitrile. The mix is heated to 50°C and stirred as 93.5g (0.5. mole) ethylene bis(chloroformate) is gradually added. Carbon dioxide is evolved. After the addition of the chloroformate is completed, the mixture is heated to reflux until no more $CO_2$ is evolved. The mixture is then cooled and the solid product filtered off (288g). The product (containing sodium chloride) is suspended in warm water and agitated. The solid is filtered off and washed well with warm water and dried. Yield = 229g. This melts with decomposition at 243° C.

| Analysis | Calc. | Found |
|---|---|---|
| % C | 42.10 | 41.05 |
| H | 3.51 | 3.71 |
| N | 12.28 | 11.23 |
| S | 14.03 | 13.76 |

EXAMPLE XXVI - EXPANSION OF POLYVINYL CHLORIDE WITH ISOPROPYL-3-(P-TOLUENE SULFONYL) CARBAZATE

A PVC pipe compound of the following recipe is prepared

| | parts |
|---|---|
| PVC resin (sp. visc. = .38 at .4% soln. in nitrobenzene at 30°C.) | 100 |
| Tributyl tin mercaptoglycollate | 2 |
| Calcium stearate | 2 |
| Sodium stearate | 0.25 |
| Petroleum wax (microcrystalline with a m.p. of 143–150°C.) | 0.8 |
| Titanium dioxide | 1.0 |
| Poly(methyl methacrylate) (intrinsic visc. = 1.44 at 30 C in toluene) | 4.0 |
| Isopropyl-1-3-(p-toluene sulfonyl)carbazate | 0.2 |

This composition is thoroughly mixed and is then introduced into a 2-½ Davis standard extruder (with auxilliary cmpacter) equipped with a two stage screw (2/1 compression ratio) and a 1 inch schedule 40 die. The following conditions are employed in the extruder:

| Barrel temperature °C. | | | | | | | | Screw temp. °C. | Stock temp. °C. | Rate g/min. | RPM |
|---|---|---|---|---|---|---|---|---|---|---|---|
| 1 | 2 | 3 | 4 | 5 | 1 | 2 | 3 | | | | |
| 188 | 193 | 199 | 204 | 210 | 182 | 150 | 204 | 65 | 207 | 723 | 30 |

The resultant extruded product is well expanded and exhibits a specific gravity of 1.28 as compared to a specific gravity of 1.40 for an unexpanded (i.e., without blowing agent) sample of the same composition.

EXAMPLE XXVII - EXPANSION OF POLYESTER RESIN

Tests on two sulfonyl carbazate compounds as blowing agents in are conducted in a 3 oz Van Dorn reciprocating screw injection molding machine. The polyester resin contains 70% polybutylene-terephthalate and 30% glass fibers and has a viscosity of $5.7 \times 10^3$ poise at a shear rate 100 sec.$^{-1}$, 250°C. The following conditions are used in both tests:

| Injection forward | 3 sec. |
|---|---|
| Booster time | 1½ sec. |
| Clamp closed | 60 sec. |
| Barrel residence | 15 sec. |
| Injection pressure | 1600–1800 psi |
| Back pressure | 55 psi |
| Screw speed | 80 RPM |

| Blowing Agent | Amt. | Temperatures °C. | | | | | Sp. G. |
|---|---|---|---|---|---|---|---|
| | | Rear | Front | Nozzle | Stock | Mold | |
| 4,4'-Biphenylenebis(iso-propyl-3-sulfonyl carbazate) | 0.5 | 235 | 246 | 277 | 260 | 38 | 1.14 g/cc |
| 4,4'-Biphenylenebis(methyl-3-sulfonyl carbazate) | 0.5 | 235 | 246 | 271 | 260 | 38 | 1.09 g/cc |

The specific gravity of the unblown resin = 1.56 g/cc.

EXAMPLE XXVIII - EXPANSION OF POLYESTER RESIN

The blowing agents listed below are tumple blended with the same polyester resin of Example XXVII using 22.7 g. of blowing agent in 5 pounds (2265 g.) of resin and each mix is placed in the hopper of a 3 oz. reciprocating screw Ankerwerk injection molding machine and the following conditions are held constant during the injection of each mix (to form parts measuring 3 inch × 2.25 inch × 0.125).

| Temperature | |
|---|---|
| Zone 1 | 250°C |
| Zone 2 | 250°C |
| Nozzle | 293°C |
| Stock Pressure (PSI) | 265–270°C |
| Injection | 800 |
| Back | 200 |
| Cycle (sec) | |
| Mold open | 3 sec. |
| Screw forward | 10 sec. |

Mold closed -this time was varied for each blowing agent. Parts were obtained with the mold closed for 420 seconds.

The following blowing agents are tested:

| | Weight of part |
|---|---|
| (1) no blowing agent | 21 g. |
| (2) p,p'-Biphenylenebis(sulfonyl isopropyl carbazate) | between 14–15 g. |
| (3) p,p'-Biphenylenebis(sulfonyl ethyl carbazate) | '' |
| (4) p,p'-Biphenylenebis(sulfonyl isobutyl carbazate) | '' |
| (5) p,p'-Biphenylenebis(sulfonyl 2- | |

| | Weight of part |
|---|---|
| ethylhexyl carbazate) | " |
| (6) p,p'-Biphenylenebis(sulfonyl n-butyl carbazate) | " |
| (7) 1,3-Dimethylbenzene-4,6-bis (sulfonyl methyl carbazate) | " |
| (8) p,p'-Oxybis(benzene sulfonyl ethyl carbazate) | " |
| (9) p,p'-Oxybis(benzene sulfonyl isopropyl carbazate) | " |
| (10) p,p'-Biphenylenebis(sulfonyl methyl carbazate) | " |

The reduction in density from 21 g. for the unexpanded polymer to values of 14–15 g. for each of the blowing agents demonstrates the expanding action of these agents.

EXAMPLE XXIX EXPANSION OF A RUBBER COMPOSITION WITH P,P'-OXYBIS(N-BENZENE SULFONYL-N'-CARBOISOPROPOXY HYDRAZIDE)

A rubber composition of the following recipe is prepared:

| Masterbatch | |
|---|---|
| 50% Nitrile rubber/50% PVC by weight | 100.0 |
| Epoxidized soybean oil, 6.5% oxiran content (wt) | 4.0 |
| Epoxidized soybean oil, 6.0% oxiran content (wt) | 8.0 |
| Medium thermal carbon black | 20.0 |
| Phthalate plasticizer, sp. grav. 1.119 | 10.0 |
| Dioctyl phthalate | 12.0 |
| Antimony oxide | 6.65 |
| Diphenyl guanidine | .33 |
| Zinc diethyldithiocarbamate | 1.0 |
| Spider sulfur | 2.7 |
| | 164.68 |

This masterbatch is then formulated as follows:

| | A | B | C | D |
|---|---|---|---|---|
| Masterbatch | 164.68 | 164.68 | 164.68 | 164.68 |
| p,p'-Oxybis(N-benzene-sulfonyl-N'-carbo-isopropoxy hydrazide) | 2.0 | 2.0 | 2.0 | 2.0 |
| Zinc oxide | | 3.3 | | 3.3 |
| Surface treated urea | | | 1.3 | 1.3 |
| | 166.68 | 169.98 | 167.98 | 171.28 |

The materials of the masterbatch are blended on a rubber mill andother additives are subsequently blended in on the mill as indicated. The stocks are then extruded through a ¼ inch round die and cut into 4 inch lengths. The piecees were coated with talc and placed in a tray in a hot oven for
a. 5, 10, 15, and 20' at 150°C.
b. 5, 10, 15, and 20' at 165°C.
c. 5, 10, 15, and 20' at 175°C.

The density of the expanded pieces were measurued (lbs./cu. ft.)-see Table I.

TABLE I

Densities of Expanded Sponge

| Temp. | Time | A | B | C | D |
|---|---|---|---|---|---|
| 150°C. | 5' | 64.4 | 69.1 | 50.6 | 41.4 |
| | 10' | 58.2 | 61.4 | 36.8 | 35.8 |
| | 15' | 51.3 | 57.5 | 34.7 | 32.9 |
| | 20' | 49.5 | 57.2 | 33.0 | 31.3 |
| 165°C. | 5' | 66.8 | 68.9 | 34.5 | 38.6 |
| | 10' | 44.0 | 51.3 | 28.9 | 27.7 |
| | 15' | 36.2 | 42.7 | 23.5 | 21.5 |
| | 20' | 31.6 | 37.5 | 19.7 | 17.0 |
| 175°C. | 5' | 44.9 | 58.2 | 30.8 | 28.8 |
| | 10' | 28.2 | 33.4 | 23.2 | 16.5 |
| | 15' | 19.4 | 35.5 | 15.9 | 12.4 |
| | 20' | 21.7 | 22.7 | 14.1 | 9.9 |

These data demonstrate the blowing properties of p,p'-Oxybis(N-benzene sulfonyl-N'-carboisopropoxy hydrazide). As can be seen, temperatures in the 180°C. range are desirable and urea or urea-zinc oxide combination provide effective activation.

EXAMPLE XXX EXPANSION OF ETHYLENE-PROPYLENE RUBBER

An ethylene (47.5% by weight)-propylene (47.5%)-ethylideneorbornene (5%) terpolymer (EPDM) having a Mooney viscosity of 50° at 100°C. is compounded in a Banbury-type internal mixer using the following recipes:

| Masterbatch | A | B | C |
|---|---|---|---|
| EPDM | 100 | 100 | 100 |
| Zinc Oxide | 5 | 5 | 5 |
| Stearic acid | 5 | 5 | 5 |
| Carbon Black | 100 | 100 | 100 |
| Paraffinic oil | 70 | 70 | 70 |
| Calcium carbonate | 100 | 100 | 100 |
| Mercaptobenzothiazole | 1.5 | 1.5 | 1.5 |
| Tellurium dithio-carbamate | 0.5 | 0.5 | 0.5 |
| Sulfur | 2 | 2 | 2 |
| BBIH[1] | — | 10 | — |
| OBEH[2] | — | — | 10 |
| Surface Treated Urea | — | 2 | — |

[1]BBIH - p,p'-biphenylenebis(3-carboisopropoxy sulfonyl hydrazide)
[2]OBEH - p,p'-diphenyl etherbis(3-carboisopropoxy sulfonyl hydrazide)

The following compounding procedure is used:
Banbury, No. 1 speed, no heating or cooling

| Time | |
|---|---|
| 0' | charge EPDM |
| 1' | load ½oil and carbon black |
| 3' | load ½oil and CaCO₃ |
| 5' | load ½oil and remaining ingredients |
| 7½' | dump masterbatch |

The above compounded stock was cured in an air oven for 10 minutes at 195°C., and about 4 hours later density measurements were taken with these results:

| | A | B | C |
|---|---|---|---|
| Density lbs/ft³ | 67.7 | 29.4 | 40.8 |

This experiment indicates that a reduction of density of at least 35% was achieved employing the blowing agents of the invention in this formulation.

EXAMPLE XXXI EXPANSION OF NITRILE RUBBER-POLY(VINYL CHLORIDE) BLEND

A blend of 70% (by weight) nitrile rubber(NBR)-30% PVC, Mooney viscosity (ML-4) of 55 at 100°C. is compounded with the following ingredients in a Banbury-type internal mixer:

| Masterbach | A | B | C |
|---|---|---|---|
| NBR-PVC blend | 100 | 100 | 100 |
| Zinc Oxide | 4 | 4 | 4 |
| Stearic Acid | 5 | 5 | 5 |
| Carbon Black | 80 | 80 | 80 |
| Dioctyl Phthalate | 50 | 50 | 50 |
| Calcium carbonate | 70 | 70 | 70 |
| Mercaptobenzothiazole | 1.5 | 1.5 | 1.5 |
| Tetramethylthiuram-monosulfide | 0.5 | 0.5 | 0.5 |
| Sulfur | 2 | 2 | 2 |
| DIDA[1] | 2 | 2 | 2 |
| Surface Treated Urea | — | 2 | 2 |
| BBIH[2] | — | 10 | — |
| OBEH[3] | — | — | 10 |

[1]DIDA - p,p'-Diphenylaminebis(1,1,3,3-tetramethylbutyl)
[2]BBIH and
[3]OBEH - See Example XXX The above ingredients are compounded under the following conditions:

Banbury, No. 1 Speed, no heating, no cooling

| Time | |
|---|---|
| 0' | Load Blend |
| 1' | Load ¼ DOP and carbon black |
| 2½ | Load ¼ DOP and CaCO₃ |
| 4' | Load ¼ DOP and remaining ingredients |
| 5½ | Load ¼ DOP |
| 7' | drop |

The above stocks are cured in an air oven for 10 minutes at 195°C., and are then measured for density after about 4 hours with these results:

| | A | B | C |
|---|---|---|---|
| Density, lbs/ft³ | 54.1 | 28.4 | 31.8 |

An effective reduction of density of at least 40% was achieved employing the blowing agents of the invention in this formulation.

What is claimed is:

1. A composition comprising a gas-expandable polymeric material and at least one sulfonyl carbazate containing at least one —SO₂—NHNH—COO—group.

2. The composition of claim 1 wherein the sulfonyl carbazate has the formula

R—SO₂—NHNH—COO—R¹ wherein R and R¹ are the same or different and are alkyl having 1 to 12 carbon atoms, alkenyl having 2 to 12 carbon atoms, aryl, aralkyl, and alkaryl having 6 to 10 carbon atoms, and cycloalkyl having 5 to 8 carbon atoms.

3. The composition of claim 2 wherein R¹ is a secondary alkyl radical having 3 to 8 carbon atoms.

4. The composition of claim 2 wherein R¹ is isopropyl.

5. The composition of claim 2 wherein R¹ is sec-butyl.

6. The composition of claim 1 wherein the sulfonyl carbazate has the formula

R¹—OOC—NHNH—SO₂-Y—SO₂—NHN-H—COO—R¹ wherein the R¹ substituents are the same or different and are alkyl having 1 to 12 carbon atoms, alkenyl having 2 to 12 carbon atoms, aryl, aralkyl, and alkaryl having 6 to 10 carbon atoms, and cycloalkyl having 5 to 8 carbon atoms; and wherein Y is alkylene having 2 to 12 carbon atoms, arylene and alkarylene having 6 to 12 carbon atoms, and a group of the formula

—R²—Z—R³— wherein Z is a single bond connecting R² and R³, —O—, —S—, —SO—, —SO₂—, —NR⁴— wherein R⁴ is hydrogen or an alkyl group with 1 to 4 carbon atoms, alkylene having 1 to 6 carbon atoms, and alkylidene having 2 to 3 carbon atoms, and wherein R² and R³ are the same or different and are alkylene having 2 to 4 carbon atoms and phenylene.

7. The composition of claim 6 wherein the R¹ substituents are the same.

8. The composition of claim 6 wherein the R¹ substituents are secondary alkyl radicals having 3 to 8 carbon atoms.

9. The composition of claim 6 wherein the R¹ substituents are isopropyl radicals.

10. The composition of claim 6 wherein the R¹ substituents are sec-butyl radicals.

11. The composition of claim 6 wherein Y is selected from alkylene having 2 to 4 carbon atoms.

12. The composition of claim 6 wherin Y is selected from the group consisting of phenylene, biphenylene, naphthalene, tolylene, xylylene, and oxybis (phenylene).

13. The composition of claim 6 wherein Z is —O—.

14. The composition of claim 1 wherein the sulfonyl carbazate has the formula.

R—SO₂—NHNH—COO—Y'—OOC—NHN-H—SO₂—R wherein the R substituents are the same or different and are alkyl having 1 to 12 carbon atoms, alkenyl having 2 to 12 carbon atoms, aryl, aralkyl, and alkaryl having 6 to 10 carbon atoms, and cycloalkyl having 5 to 8 carbon atoms; and wherein Y' is alkylene having 2 to 12 carbon atoms, arylene and alkarylene having 6 to 12 carbon atoms, and a group of the formula

—R²—Z—R³— wherein Z is a single bond connecting R² and R³, —O—, —S—, —SO—, —SO₂—, —NR⁴— wherein R⁴ is hydrogen or an alkyl group with 1 to 4 carbon atoms, alkylene having 1 to 6 carbon atoms, and alkylidene having 2 to 3 carbon atoms, and wherein R² and R³ are the same or different and are alkylene having 2 to 4 carbon atoms and phenylene.

15. The composition of claim 14 wherein the R substituents are the same.

16. The composition of claim 14 wherein Z is -O-.

17. The composition of claim 1 wherein the sulfonyl carbazate is a polymer of the formula

{Y—SO₂—NHNH—COO—Y'—OOC—NHN-H—SO₂} wherein Y and Y' are the same or different and are alkylene having 2 to 12 carbon atoms, arylene and alkarylene having 6 to 12 carbon atoms, and a group of the formula

—R²—Z—R³— wherein Z is a single bond connecting R² and R³, —O—, —S—, —SO—, —SO₂—, —NR⁴— wherein R⁴ is hydrogen or an alkyl group with 1 to 4 carbon atoms, alkylene having 1 to 6 carbon atoms, and alkylidene having 2 to 3 carbon atoms, and wherein R² and R³ are the same or different and are alkylene having 2 to 4 carbon atoms and phenylene, and wherein n is 2 to 100.

18. The composition of claim 17 wherein n is 2 to 50.

19. The composition of claim 17 wherein Y and Y' are different.

* * * * *

UNITED STATES PATENT AND TRADEMARK OFFICE
CERTIFICATE OF CORRECTION

PATENT NO. : 3,925,270
DATED : December 9, 1975
INVENTOR(S) : BYRON A. HUNTER

It is certified that error appears in the above-identified patent and that said Letters Patent are hereby corrected as shown below:

Claim 5, line 1, underline "sec".

Claim 6, the formula at lines 3 and 4 should read:

$$R'-OOC-NHNH-SO_2-Y-SO_2-NHNH-COO-R'$$

Claim 10, line 2, underline "sec".

Claim 12, line 1, delete "wherin" and insert --wherein--.

Claim 14, the formula at line 3 should read:

$$R-SO_2-NHNH-COO-Y'-OOC-NHNH-SO_2-R$$

Claim 17, the formula at line 3 should read:

$$[-Y-SO_2-NHNH-COO-Y'-OOC-NHNH-SO_2-]_n$$

Signed and Sealed this twenty-ninth Day of June 1976

[SEAL]

Attest:

RUTH C. MASON
*Attesting Officer*

C. MARSHALL DANN
*Commissioner of Patents and Trademarks*